Figure 1:
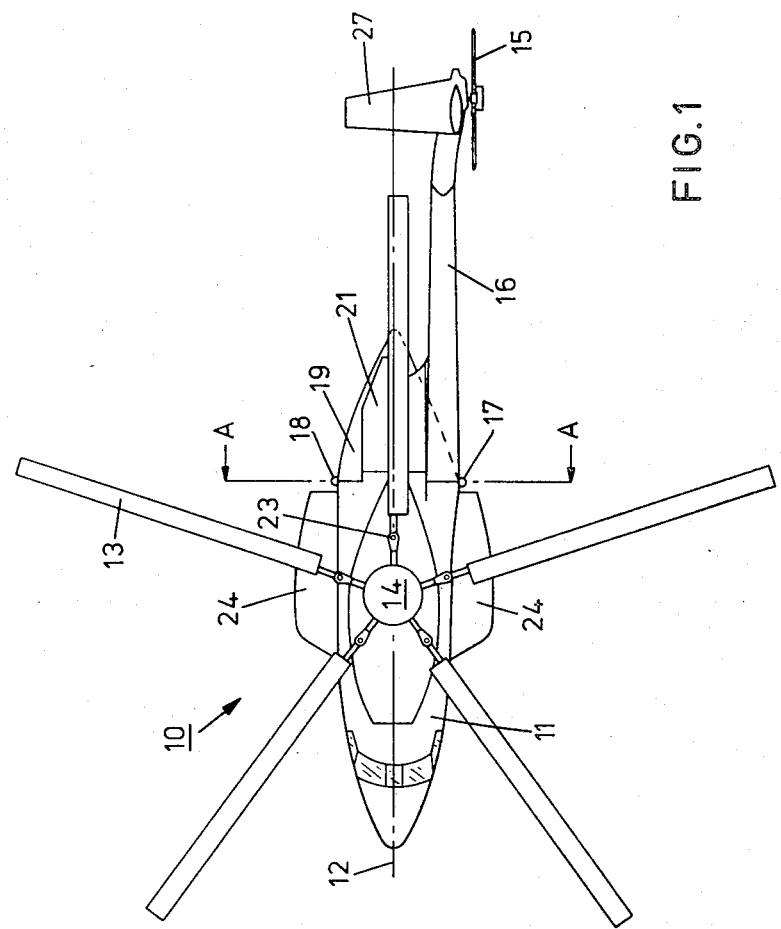

United States Patent

Jupe et al.

[11] 3,921,938
[45] Nov. 25, 1975

[54] HELICOPTERS

[75] Inventors: Robert John Jupe; Walter Charles Joiner, both of Yeovil, England

[73] Assignee: Westland Aircraft Limited, England

[22] Filed: Aug. 27, 1974

[21] Appl. No.: 501,186

[30] Foreign Application Priority Data
Aug. 28, 1973 United Kingdom............... 40553/73

[52] U.S. Cl.................. 244/17.11; D12/73; 416/142
[51] Int. Cl.²........................................ B64C 27/50
[58] Field of Search................... 416/142, 143, 153; 244/17.11, 17.19, 118 R, 129 D, 2, 17.17; D12/73, 71, 74

[56] References Cited
UNITED STATES PATENTS

| | | | |
|---|---|---|---|
| 2,689,696 | 9/1954 | Gannon............................ | 244/118 R |
| 2,752,114 | 6/1956 | Calvy.............................. | 244/118 R |
| 3,116,896 | 1/1964 | Sigler et al........................ | 244/2 |
| 3,744,742 | 7/1973 | Gear................................ | 244/17.11 |
| 3,750,982 | 8/1973 | Gear................................ | 244/17.11 |

Primary Examiner—Trygve M. Blix
Assistant Examiner—Paul E. Sauberer
Attorney, Agent, or Firm—Larson, Taylor and Hinds

[57] ABSTRACT

A helicopter has a fuselage, a main rotor system including a plurality of rotor blades and an anti-torque rotor supported at the rear end of a tail boom which in a flying configuration extends rearwardly from a forward end attached to the fuselage through a generally vertical hinge. The main rotor blades are foldable forwardly to a stowed position above a forward part of the fuselage and the tail boom is offset from a longitudinal centreline of the fuselage and foldable forwardly to a stowed position along one side of the fuselage to significantly reduce the folded dimensions of the helicopter over existing configurations, which is a very important criterion when the helicopter has to be stowed in a confined space such as a ship's hangar. In the embodiment shown the fuselage is provided with a large rear access fitted with clam type doors which can be folded to an open position adjacent each side of the fuselage to further reduce the overall length in the folded configuration.

14 Claims, 5 Drawing Figures

HELICOPTERS

This invention relates to helicopters.

Helicopters designed to operate from the deck of a ship are usually constructed so that the main rotor blades and tail boom are foldable to facilitate stowage in the confined spaces available on board. Existing helicopters are arranged so that the rotor blades are folded rearwardly to overlie the fuselage and part of the tail boom, the remaining portion of which is foldable forwardly about a substantially vertical hinge positioned in the tail boom and corresponding approximately with the rearmost extent of the folded blades.

Attempts to enlarge such machines and to maintain or improve their performance, especially the hovering capabilities, have been frustrated because existing folding arrangements are restricitive in that larger machines cannot be folded into stowage space available on board ship. This is because any increase in the length of the main rotor blades to maintain or improve satisfactory performance of larger machines results in increased torque, thereby necessitating either a larger diameter anti-torque rotor or a longer tail boom for supporting the anti-torque rotor. This increases the weight of the helicopter aft of the c.g., resulting in a tail-heavy machine, which must therefore be balanced either by ballast or by lengthening the fuselage forward of the c.g. Both solutions are undesirable, ballast causing a waste of space and being detrimental to performance and a lengthening of the nose of the fuselage causing an increase in the length of the folded machine, which is of course in addition to the increased length caused by the longer main rotor blades. Alternatively, of course, the nose length might be reduced to facilitate folding into the necessary length, but this is also unsatisfactory in that it necessitates moving the cabin aft, which not only adds to the tail heaviness aspect but also causes a wide c.g. variation with loading condition.

According to the invention we provide a helicopter having a fuselage, a main rotor system including a plurality of main rotor blades, and an anti-torque rotor supported at the rear end of a tail boom which in a flying configuration extends rearwardly from a forward end attached to the fuselage, wherein the tail boom is offset from the longitudinal centreline of the fuselage and is foldable forwardly about a generally vertical hinge adjacent its forward end to a stowed position along a side of the fuselage, and the main rotor blades are foldable forwardly to a stowed position above a forward part of the fuselage.

Figure 2:
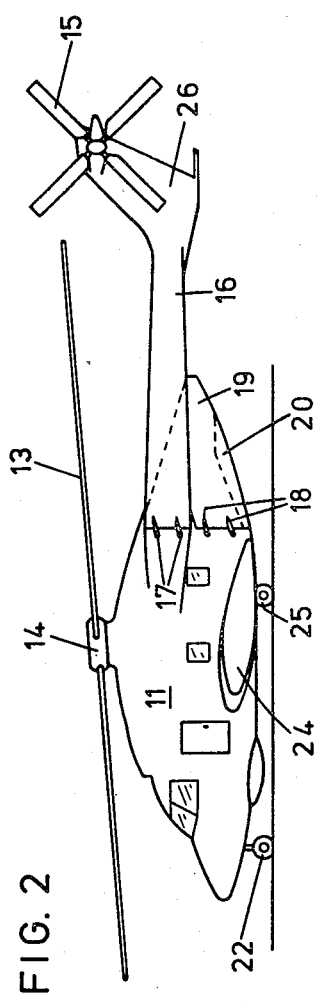
Figure 3:
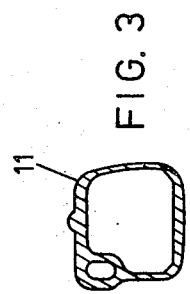
Figure 4:
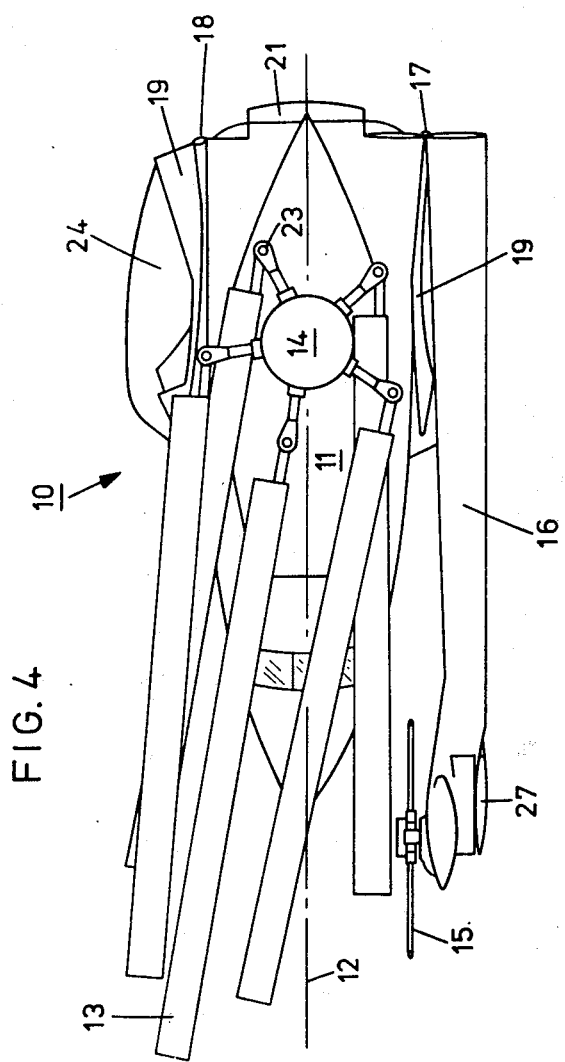
Figure 5:
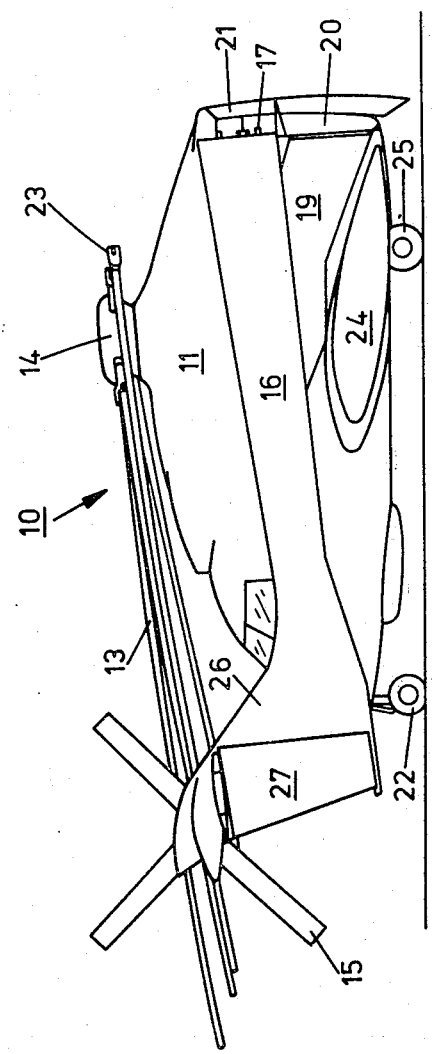

The invention will now be described by way of example only and with reference to the accompanying drawings, in which:

FIG. 1 is a plan view of a helicopter according to one embodiment of the invention in a flying configuration, FIG. 2 is a side view of FIG. 1, FIG. 3 is a sectioned view on lines A—A of FIG. 1, FIG. 4 is a plan view showing the helicopter of FIGS. 1 and 2 in a folded configuration for stowage, and FIG. 5 is a side view of FIG. 4.

Referring now to FIGS. 1, 2 and 3, a helicopter generally indicated at 10 includes a fuselage 11 having a longitudinal centreline 12. The helicopter 10 has a main rotor system comprising a plurality of main rotor blades 13 extending radially from a rotor hub 14, and an anti-torque rotor 15 supported adjacent a rear end of a tail boom 16 extending rearwardly from the fuselage 11. The tail boom 16 is offset from the longitudinal centreline 12 of the fuselage 11 and, in the embodiment shown, extends generally paralleld thereto, from an attachment on the port side of the rear of the fuselage, as will be clear from FIG. 1. From FIGS. 2 and 3 it will be clear that the tail boom 16 is mounted on the port side adjacent the upper surface of the fuselage 11.

A forward end of the tail boom 16 is attached to the fuselage 11 through a generally vertical hinge 17 located on the outer surface of the port side of the fuselage 11 (FIG. 1) and which, in the embodiment shown, is located in approximately the same vertical transverse plane as hinges 18 of clam type rear doors 19. A ramp 20 and a cover 21 are pivotally mounted to lower and upper surfaces of the fuselage 11 respectively, and cooperate with the doors 19 to close off the rear of the fuselage 11 in the flying configuration.

The anti-torque rotor 15 is mounted on the outside surface of the boom 16 on an upstanding fin 26, and a horizontally extending stabilising fin 27 is mounted on the inner surface of the boom 16 opposite the rotor 15 by hinged mountings (not shown), enabling the fin 27 to be folded downwardly to a generally vertical stowed position.

Sponsons 24 extend from the fuselage 11 and support retractable undercarriage wheels 25, the undercarriage being completed by a retractable nose wheel 22 (FIGS. 2 and 5).

The main rotor blades 13 are attached through hinges 23 about which the rotor blades 13 can be folded to facilitate stowage. In this invention the blades 13 are folded forwardly to a stowed position in which they are generally aligned with the longitudinal centreline 12 and above the forward part of the fuselage 11. The folding operation can be power operated, for instance, hydraulically, and automatic sequencing of blade movements can be incorporated.

Referring now to FIGS. 4 and 5, the helicopter 10 is shown in its folded configuration ready for stowage. The rotor blades 13 have been folded forwardly about the hinges 23 to a stowed position generally aligned with the longitudinal centreline 12 and above the forward part of the fuselage 11, and the tail boom 16 has been folded forwardly about the hinge 17 to a stowed position alongside the port side of the fuselage 11. It will be noted that in the folded configuration, the foremost extent of the anti-torque rotor 15 does not extend beyond the foremost extent of the folded main rotor blades 13 and, in the embodiment shown, the tail boom 16 extends forwardly in a direction generally parallel to the longitudinal centreline 12 of the fuselage 11. In the particular embodiment shown the doors 19 are opened to a position adjacent the sides of the fuselage 11, and the ramp 20 and cover 21 are retained generally vertically to further reduce the overall length of the helicopter 10 in its folded configuration. The fin 27 has been moved to its vertical stowed position.

A reduction in height in the stowed configuration is achieved by locating the hinge 17 at a small angle to the vertical so that the tail boom 16 moves through a slightly downwardly inclined arc from the operational position shown in FIG. 2 to the stowed position shown in FIG. 5.

In a helicopter according to the invention any tail heavy tendencies caused by a more powerful anti-torque rotor can be counterbalanced by a lengthening of the nose of the fuselage certainly without any increase in the folded length, because the forward part of the fuselage is located beneath the folded rotor blades 13. This also facilitates location of the hinge 17 much further forward than on known helicopters, and the offset tail boom 16 means that when folded the boom 16 lies adjacent the side of the fuselage 11, ensuring that the helicopter is folded into the smallest possible size, as shown in FIG. 4. Apart from the benefits with respect to reduction in folded length derived from this invention, the lengthening of the nose of the fuselage means that the cabin is more centrally positioned relative the rotor, thus reducing the required c.g. range, making load distribution less critical and improving the flying characteristics.

A helicopter according to this invention can be folded into a stowed size significantly smaller than is possible with known helicopters of similar size, which also means of course that a larger helicopter with longer rotor blades can be operated from existing confined spaces without having to increase the available stowage area. Apart from its benefit to folding, the offset tail boom 16 means that a large rear access can be provided to the cabin space to facilitate loading and unloading and ensure rapid role changes and the carriage of large loads. If loading and unloading is being accomplished with the main rotor blades folded there is no danger of damaging the blades and, even with the tail boom 16 extended, the likelihood of damaging the anti-torque rotor 15 is minimised by its position on the outside of the boom 16, which ensures clear loading access to the fuselage 11.

Operationally, the location of the anti-torque rotor 15 in the embodiment shown is advantageous in that the slipstream from the rotor is directed away from the fin 27. It should also be noted that the port side location of the tail boom means that a cabin access door customarily located on the starboard side for winch rescue purposes is accessible in the folded configuration. However, the invention should not be considered limited to the port side location as similar benefits with regard to folded length and flying characteristics are to be gained from mounting the tail boom 16 for folding to a stowed position alongside the starboard side of the fuselage 11.

It is estimated that a helicopter according to the invention having a gross weight of approximately 30,000 pounds and an overall flying length of approximately 90 feet can be folded into a stowed length of approximately 48 feet. This compares most favourably with an existing helicopter having a conventional configuration and folding arrangement and being of approximately 20,000 pounds gross weight which has a folded length of approximately 52 feet.

We claim as our invention:

1. A helicopter comprising in combination,
a fuselage,
a main rotor system including a plurality of main rotor blades, each of said main rotor blades being foldable forwardly to stowed position above a forward part of the fuselage,
an anti-torque rotor,
a tail boom supporting said anti-torque rotor adjacent to one end of said boom, and
attachment means for attaching the other end of said tail boom to a rear part of the fuselage, said attachment means comprising a generally vertical hinge located at one side of the fuselage so that, in a flying configuration, the said tail boom is offset from a longitudinal centerline of the fuselage and extends rearwardly and generally parallel to the centerline, and, in a stowed position, the said tail boom is folded about the hinge to a position in which said tail boom extends forwardly along the side of the fuselage and generally parallel to its longitudinal centerline.

2. A helicopter as claimed in claim 1, wherein the hinge is located so that in the stowed position the foremost extent of the anti-torque rotor does not extend beyond the foremost extent of the folded main rotor blades.

3. A helicopter as claimed in claim 1, wherein in the flying configuration the tail boom extends in a direction generally parallel to the longitudinal centerline of the fuselage from adjacent one side of the fuselage.

4. A helicopter as claimed in claim 1, wherein in the stowed position the tail boom extends forwardly from the hinge along the one side of the fuselage in a direction generally parallel to the longitudinal centerline of the fuselage.

5. A helicopter as claimed in claim 1, wherein the tail boom extends from an upper surface of the fuselage.

6. A helicopter as claimed in claim 1, wherein in the flying configuration the anti-torque rotor is mounted on an outer surface of the tail boom.

7. A helicopter as claimed in claim 1, wherein a rear access is provided to the interior of the fuselage.

8. A helicopter as claimed in claim 7, wherein a pair of clam type doors are provided at the rear of the fuselage and mounted one on each side of the fuselage on generally vertical hinges.

9. A helicopter as claimed in claim 8, wherein the hinges mounting each door are located in approximately the same vertical plane as the hinge mounting the forward end of the tail boom to the fuselage.

10. A helicopter as claimed in claim 8, wherein the hinge mounting each door is adapted so that each door can be folded to a fully open position alongside its respective outside surface of the fuselage.

11. A helicopter as claimed in any one of claim 8, wherein a ramp is pivotally mounted to a lower surface of the fuselage adjacent the access opening and a cover is pivotally mounted to an upper surface of the fuselage adjacent the access opening, the ramp and cover associating with the clam type doors to close the access opening when the helicopter is in the flying configuration.

12. A helicopter as claimed in claim 11, wherein the ramp and cover can be folded to generally vertically extending positions when the clam doors are open.

13. A helicopter as claimed in claim 1, wherein the tail boom is located on the port side of the longitudinal centerline and is folded alongside the port side of the fuselage when in the stowed position.

14. A helicopter as claimed in claim 1, wherein the hinge at the forward end of the tail boom is at an angle to the vertical so that when moving from its extended position the anti-torque rotor moves forwardly in a slightly downwardly inclined arc into its stowed position.

* * * * *